United States Patent Office 3,382,649
Patented May 14, 1968

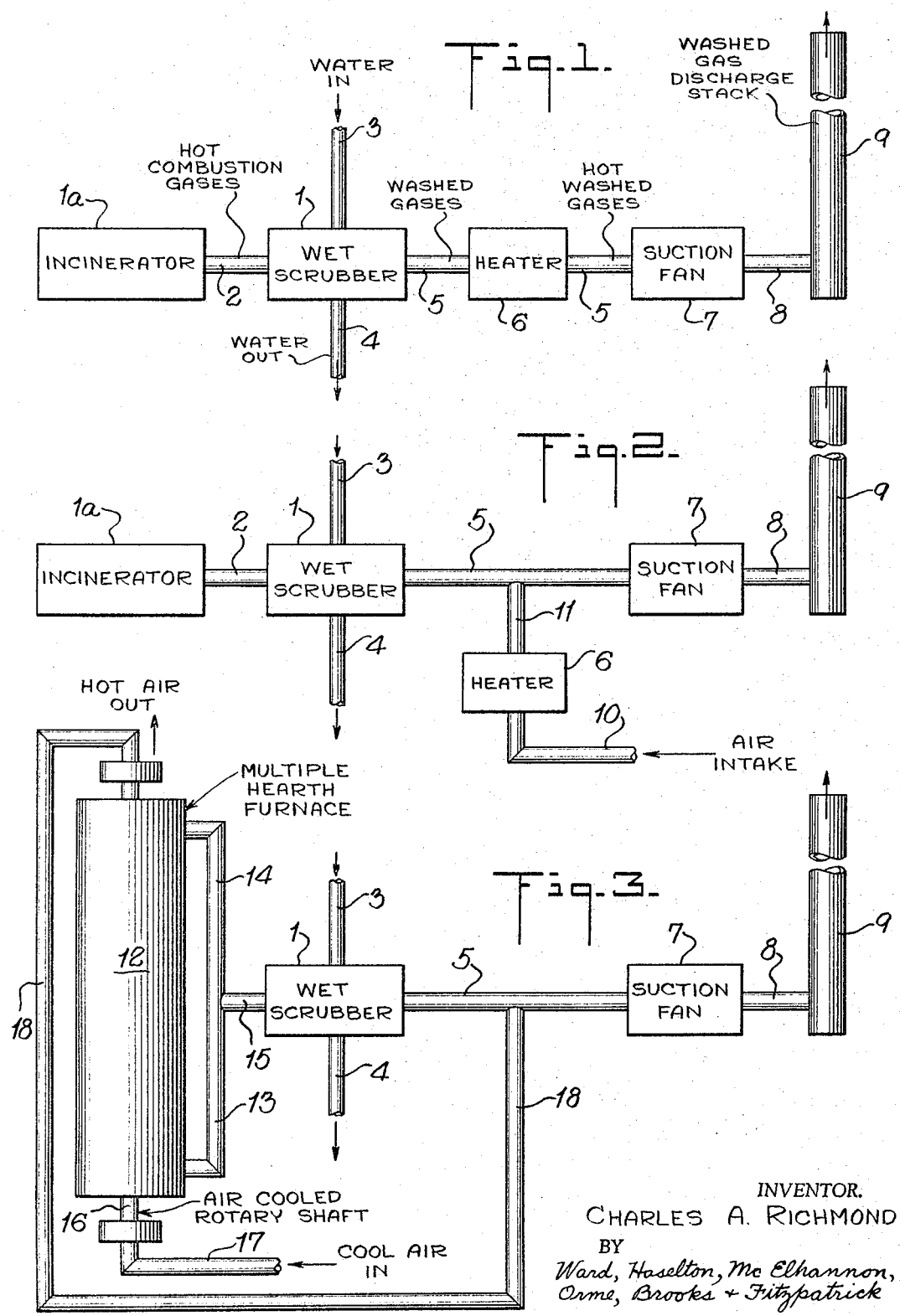

3,382,649
TREATMENT OF INCINERATOR GASES
Charles A. Richmond, Pompton Plains, N.J., assignor to Nichols Engineering & Research Corporation, New York, N.Y., a corporation of Delaware
Filed Oct. 13, 1966, Ser. No. 586,463
6 Claims. (Cl. 55—84)

ABSTRACT OF THE DISCLOSURE

A method of treating combustion gases prior to discharge so that they will not deposit sludge on the surfaces of fan blades and internal ducting, such treatment involving first, scrubbing the gases in a wet scrubber, second, using ambient air to cool various incinerator surfaces and, third, passing the thus heated ambient air in heat exchange contact with the combustion gases coming out of the wet scrubber.

---

This invention relates to the improved handling of effluents from wet scrubbers. Further this invention relates to the minimizing of maintenance and repairs of equipment handling the effluent from wet scrubbers. It also relates to improving the performance of smoke detection equipment used in conjunction with wet scrubbers. In addition it relates to the handling of the effluent from wet scrubbers whereby the appearance of said effluent is not dependent on atmospheric or topographical conditions.

One object of the invention is to provide a treatment of the effluent from wet scrubbers which preserves the units of equipment used to handle the effluent. Another object of the invention is to prevent the encrustation by gas-borne solids of the surfaces of the equipment handling the effluent. A further object of the invention is to provide a system of handling the effluent from wet scrubbers so that its appearance does not depend on the weather and other local conditions.

One of the chief means of disposal of waste materials is by combustion. The incineration or thermal destruction of sewage sludges, refuse, garbage, industrial wastes, animal or human tissues such as hospital wastes is common practice. To minimize pollution of the air with the gases, the gas-borne particulate matter and other products of combustion were these to be merely discharged from the stack of the combustion equipment, it has become common practice to pass the combustion products through some form of wet scrubber such as cyclonic, venturi, inertial impingement, mechanical or combinations thereof. These devices remove the bulk of the fly ash, particulate matter and water soluble materials from the high temperature combustion products employing sufficient quantities of water so that the discharge from the scrubber is at temperatures from 100° F. to 200° F. and at or near aqueous saturation i.e. 100% relative humidity.

Heretofore it has been the practice to pass the effluent gases from the wet-scrubber directly through a duct to an induced draft fan and thence through another duct to the atmosphere. This gas carries fly ash, an amount of water vapor which saturates the gas, a variety of gaseous materials, such as halogens and halides, the oxides of sulfur and nitrogen as well as those of carbon plus nitrogen and oxygen itself. This has resulted in a variety of troubles. Thus, in the transport of the gaseous mixture bearing finely divided solid matter, when one forces a change in direction, such as in a bend in a duct, or passage through an induced draft fan, etc. or when the gases are chilled, even slightly, water vapor condenses in these areas.

This condensation of moisture causes the air-born solids to collect, sticking to the moistened surfaces. Thus, ducts, fan casings and fan blades become encrusted with deposits of air-borne solids which tend to clog the ducts, choke the clearances in the induced draft fans, and collect unevenly on fan blades resulting in dynamic imbalance of the fan blades and excessive bearing wear and replacement. Moreover, the condensation of the moisture in the effluent gases on the surfaces of the ducts, fan casings, the fan rotor and blades results in localized and excessive corrosion. The oxides of sulfur, of nitrogen, of halogens as well as the halogens themselves, and the hydrogen halides are all water soluble. These dissolve in the condensed water vapor or in other ways deposit on the surfaces to create highly corrosive conditions which are deleterious to the materials of construction of both fans and ducts.

In addition, these moistened solids, borne in the gas stream, close to or actually saturated with moisture, interfere with and render inoperative the conventional equipment used to determine the amount of solids in the gas stream being discharged to the atmosphere. The usual equipment involves a light source located on one side of the discharge duct while on the other side is a photoelectric cell which passes or generates electric current proportional to the light falling thereon. Both the light source and the measuring device should indicate the extent to which the gas-borne solids interrupt the passage of the light beam. The transparent plates protecting the light source and the photocell from the effluent gases from the scrubber become coated with the moist solids gas-borne from the scrubber. This coating interferes with the passage of the light beam causing a constantly increasing error of the deposit build up, thus rendering the system useless as an indicator of airborne solids.

Furthermore it has been found that according to present practice, gases bearing more solids than 0.85 pound per 1,000 pounds of gases discharged, corrected to 50% excess air based on the combustion gas analysis as is currently considered acceptable in terms of Air Pollution Codes of the A.S.M.E., can appear, under certain atmospheric conditions, to carry solids in accordance with or below the code limit. As an example, the effluent from the stack when observed on a dark day against a grey sky, appears to be relatively clean of gas-borne solids because of the lack of contrast between the effluent and the grey sky background. On the other hand, when the rate of gaseous discharge is slow, when the topography, the adjoining building height and atmospheric conditions are right, the effluent gases travel downward instead of being dispersed by diffusion or wind conditions, giving the appearance of being heavily laden with solids.

From the above, it can be seen that the control of the quality of the effluent gases from the conventional wet scrubber is particularly difficult. The photoelectric system is not reliable nor is the visual evaluation of the output of the stack.

This invention consists in simple and economical means of obviating the above difficulties in the operation of wet scrubbers. These means involve those necessary to remove the state of saturation so far as water is concerned and the creation of a highly unsaturated conditioned. They are best located between the wet scrubber and the induced draft fan.

In the accompanying drawing, FIGS. 1 to 3, inclusive, illustrate diagrammatically three different embodiments for practicing the invention. One simple means for achieving the objectives of the invention, is to heat the scrubber effluent to such a temperature that during passage through the fan and the subsequent duct work, the gases remain well above the dew point or well removed from aqueous saturation. Thus, depending on conditions the gases may well be heated to from 212° F. to 750° F. This can be done by the use of any conventional heat transfer device, such as fin tube heaters and the like. FIG. 1 illustrates schematically this method of treating the effluent of the wet scrubber to remove the saturation with respect to water. In this embodiment, the wet scrubber 1 receives the hot combustion gases from the incinerator 1a, through duct 2. In the wet scrubber, the gases are treated with water introduced through pipeline 3, and which leaves the scrubber through pipeline 4. The washed gases leave the scrubber through duct 5, and pass through heater 6, where the washed gases are raised in temperature to remove the saturation to a point such that condensation does not take place within the fan 7, and subsequent duct 8, and stack 9, through which the heated gases from the heater 6 are successively fed.

This method has the advantage of simplicity, but it is limited in its application to locations where heating steam or hot water gas is available and where the weather and duct work do not cool the gases to the original dew point. It is not the preferred method when the particulate matter in the gases encrusts the heater too rapidly and are difficult to clean.

A second method is to blend the effluent from the wet scrubber with additional air which has been heated to prevent the blended mixture being cooled to approach the dew point. Adding heat to the effluent by the heating of the blending air increases the gap between the temperature of the blended mixture and the dew point by raising the temperature of the effluent and lowering the dew point of the mixture. In short it increases the safety factor and eliminates the dirt problem in the heat transfer equipment. When this mixture of effluent with heated air with a lowered dew point is then fed to the induced draft fan, there is no condensation of moisture in the fan, no corrosion of the ducts and fan parts, no collection of encrusting solids on the fan casing and blades, no dynamic imbalance of the fan blades and no abnormal bearing wear. The light source and photoelectric cell remain free of encrusting solids and are able to furnish a reliable indication of the solids content of the fan discharge.

FIG. 2 illustrates schematically this second means of treating the gases from the wet scrubber to remove the saturation. As in FIG. 1, the wet scrubber 1 receives the hot combustion gases from the incinerator 1a, through duct 2. In the wet scrubber the gases are treated with water lead to the scrubber through pipeline 3, and leaving the scrubber through pipeline 4. The washed gases leave the scrubber through duct 5, in which they are mixed with heated outside air introduced from an air intake duct 10, and passed thence through heater 6 and duct 11 into admixture with the gases of duct 5. Both are sucked into the system by fan 7, which discharges into duct 8, and thence into stack 9.

The preferred method of treating the discharge from a wet scrubber is to mix it with a stream of hot air obtained from the necessary cooling operation of an air cooled apparatus, such for example as the center shaft and rabble arms of a multiple hearth furnace. In the conventional design of a multiple hearth furnace it is common practice to pass air up through the interior tube within the center shaft and out through the rabble arms, thence back into the space in the center shaft between the outer wall and the inner tube. The air thus heated passes up the shaft and out at the top. Usually the air is lead back to one of the lower hearths of the furnace. In this instance, a portion of this heated air is tapped off to be mixed with the discharge of the wet scrubber thereby reducing the degree of saturation of the mixture going to the induced draft fan and subsequent duct work. Since no heating element is needed and since the energy is available free, this is usually the most economical scheme and is, therefore, to be preferred.

FIG. 3 illustrates schematically this embodiment of the invention wherein a multiple hearth furnace is illustrated diagrammatically at 12, the hot combustion gases from lower and upper hearths of which are discharged over conduits 13 and 14 and fed thence into the wet scrubber 2 via mixing conduit 15. The rabble arms of the furnace are mounted in conventional fashion as in Von Dreusche U.S. Patent 3,153,633, on a hollow rotatable shaft 16, which is air cooled by ambient air drawn in through an intake duct 17, and passed up through shaft 16 and thence out via discharge conduit 18 which connects as shown to duct 5 extending between the wet scrubber 2 and the suction fan 7. Thus the effluent gases from the wet scrubber are heated by means of the hot air obtained by air cooling the shaft and rabble arms of the multiple hearth furnace, the thermal energy of which hot air would otherwise be wasted.

Further it has been found that the manner in which the gases from the induced draft fan 7 of all embodiments are discharged into the surrounding atmosphere is of real importance. On a still day in very cold weather, the discharge of a poorly designed stack will condense into a cloud before the discharged gases have a chance to mingle with and diffuse into the atmosphere. It has been found that this same stack discharge when ejected into the atmosphere with a velocity of at least 35 feet per second, will show no visible cloud or plume and will diffuse into the atmosphere before unsightly condensation can take place to create an unsightly appearance.

While the above description of the invention sets forth in detail the means of carrying out same, they are not to be construed as limiting the scope thereof. Thus other means of incineration, such as rotary kilns, fluidized bed units and the like are contemplated and any of the various forms of wet scrubbers can be employed therewith.

What is claimed is:

1. In a process for treating solid laden gases from a heating device, such as an incinerator, so as to reduce their deleterious effects on exhaust fans and ducting, the steps comprising, scrubbing said gases in a wet scrubber, cooling various portions of said heating device by passing ambient air thereover, and thereafter bringing the thus heated ambient air into direct heat exchange contact with said gases at a location between said scrubber and said exhaust fans.

2. The steps in the process according to claim 1 wherein the gases discharged from said wet scrubber are heated to about 212–750° F. by said thus heated ambient air prior to intake to said exhaust fans.

3. The steps in the process according to claim 1 wherein the gases discharged from said wet scrubber are heated by admixture with said thus heated ambient air prior to intake of said exhaust fan.

4. The steps in the process according to claim 3 wherein said heated ambient air is at a temperature of about 212–750° F.

5. The steps in the process according to claim 1 wherein said ambient air is passed through the center shaft and rabble arms of a multiple hearth furnace to effect cooling of said shaft and arms.

6. In a process according to claim 1, the further step of ejecting the gases from said exhaust fans and ducting into the outer atmosphere at a velocity of at least 35 feet per second.

References Cited

UNITED STATES PATENTS

| | | |
|---|---|---|
| 2,078,925 | 5/1937 | Colby et al. |
| 2,578,315 | 12/1951 | Parker _____ 55—89 |
| 3,153,633 | 10/1964 | Von Dreusche _____ 252—418 |

FOREIGN PATENTS 709,680   5/1965   Canada.

REUBEN FRIEDMAN, *Primary Examiner.*

C. N. HART, *Assistant Examiner.*